United States Patent
Rajavenkatanarayanan et al.

(10) Patent No.: US 12,039,899 B1
(45) Date of Patent: Jul. 16, 2024

(54) ADAPTIVE HEAD UP DISPLAY

(71) Applicant: GM Global Technology Operations LLC, Detroit, MI (US)

(72) Inventors: Akilesh Rajavenkatanarayanan, Macomb, MI (US); Joseph F. Szczerba, Grand Blanc, MI (US); Manoj Sharma, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/306,456

(22) Filed: Apr. 25, 2023

(51) Int. Cl.
| | |
|---|---|
| G09G 5/377 | (2006.01) |
| B60K 35/00 | (2006.01) |
| G02B 27/01 | (2006.01) |
| G06F 3/01 | (2006.01) |
| G09G 3/00 | (2006.01) |
| B60K 35/23 | (2024.01) |

(52) U.S. Cl.
CPC ............ *G09G 3/001* (2013.01); *B60K 35/00* (2013.01); *G02B 27/0101* (2013.01); *G02B 27/0179* (2013.01); *G06F 3/012* (2013.01); *G06F 3/013* (2013.01); *B60K 35/23* (2024.01); *G02B 2027/0187* (2013.01); *G09G 2320/0613* (2013.01); *G09G 2340/0464* (2013.01); *G09G 2354/00* (2013.01); *G09G 2380/10* (2013.01)

(58) Field of Classification Search
CPC .......... G09G 3/001; G09G 2320/0613; G09G 2340/0464; G09G 2354/00; G09G 2380/10; B60K 35/00; B60K 35/23; G02B 27/0101; G02B 27/0179; G02B 2027/0187; G06F 3/012; G06F 3/013
See application file for complete search history.

(56) References Cited

U.S. PATENT DOCUMENTS

2013/0076787 A1* 3/2013 Mathieu ................ G02B 27/01
345/633

* cited by examiner

*Primary Examiner* — Deeprose Subedi
(74) *Attorney, Agent, or Firm* — Vivacqua Crane, PLLC (57) ABSTRACT

A head up display (HUD) system within a vehicle includes a controller adapted to initialize HUD graphics to be displayed by the HUD system within the vehicle, a projector adapted to project HUD graphics within a field of view of the HUD system onto an inner surface of a windshield of the vehicle, and a monitoring system adapted to collect real-time data of a head position and gaze direction of an occupant within the vehicle, wherein, the controller is further adapted to adapt the displayed HUD graphics, displayed by the HUD system, based on the real-time data of the head position and gaze direction of the occupant.

20 Claims, 8 Drawing Sheets

ADAPTIVE HEAD UP DISPLAY

INTRODUCTION

Augmented reality head up display (HUD) systems provide the ability to provide a vast amount of information to an occupant within a vehicle by displaying such information on an inner surface of the windshield of the vehicle. Such information includes cluster information, such as speed and rudimentary navigation instructions, as has been done with HUD systems in the past. Such information also includes, however, alerts indicating potential dangers from objects (people, animals, other vehicles, road construction, accidents, road congestion) in proximity to a vehicle, and augmentation graphics to draw an occupant's attention to such objects.

The displaying of all this information on the windshield in front of an occupant can cause cognitive overload. Cognitive load refers to the amount of working memory used while doing a task. Cognitive overload is when there are too many things occupying an occupant, to the point that all the information becomes more harmful than helpful. Cognitive overload may lead to several issues like stress, fatigue, distraction, occlusion of the road scene and other issues which may result in accidents.

Thus, while current systems and methods achieve their intended purpose, there is a need for a new and improved system and method for providing HUD graphics to an occupant of a vehicle that reduces the level of information being displayed to the occupant based on several factors.

SUMMARY

According to several aspects of the present disclosure, a method of providing an adaptive head up display (HUD) within a vehicle includes initializing, with a controller, HUD graphics to be displayed by a HUD system within the vehicle, displaying, with at least one laser adapted to project an image onto an inner surface of a windshield of the vehicle, HUD graphics within a field of view of the HUD system, collecting, with a monitoring system, real-time data of a head position and gaze direction of an occupant within the vehicle, and adapting, with the controller, the HUD graphics displayed by the HUD system, based on the real-time data of the head position and gaze direction of the occupant.

According to another aspect, the method further includes determining, with the controller, if there are any high priority HUD graphics to be displayed, and when there are high priority HUD graphics to be displayed, displaying such high priority HUD graphics without any adaptation based on the real-time data of the head position and gaze direction of the occupant.

According to another aspect, when there are no high priority HUD graphics to be displayed, the method includes determining if the occupant is looking at a specific location within a field of view of the HUD system, and, when the occupant, based on the real-time data of the head position and gaze direction, is looking at a specific location with the field of view of the HUD system, adapting the displayed HUD graphics, wherein the HUD graphics are only displayed within the specific location within the field of view of the HUD system where the occupant is looking.

According to another aspect, when the occupant, based on the real-time data of the head position and gaze direction, is not looking at a specified location with the field of view of the HUD system, the method includes adapting the displayed HUD graphics, wherein only minimalistic HUD graphics are displayed.

According to another aspect, the method further includes saving the real-time data of the head position and gaze direction of the occupant within the vehicle to a data storage device within the controller, and updating historical data of the head position and gaze direction of the occupant within the data storage device.

According to another aspect, the initializing, with the controller, HUD graphics to be displayed by a HUD system within the vehicle further includes displaying HUD graphics based on a level of automation of the vehicle.

According to another aspect, the initializing, with the controller, HUD graphics to be displayed by the HUD system within the vehicle further includes identifying, with the monitoring system, an identity of the occupant within the vehicle, accessing, within a data storage device within the controller, historical data of the head position and gaze direction of the identified occupant, identifying, with the controller, at least one region within the field of view of the HUD system, where the identified occupant historically looks based on the historical data of the head position and gaze direction of the identified occupant, and displaying HUD graphics only within the at least one region within the field of view of the HUD system, where the identified occupant historically looks based on the historical data of the head position and gaze direction of the identified occupant.

According to another aspect, the initializing, with the controller, HUD graphics to be displayed by the HUD system within the vehicle further includes displaying HUD graphics based on a selected preferences of the occupant.

According to another aspect, the initializing, with the controller, HUD graphics to be displayed by the HUD system within the vehicle further includes displaying only high priority HUD graphics.

According to another aspect, the initializing, with the controller, HUD graphics to be displayed by the HUD system within the vehicle further includes displaying only minimalistic HUD graphics.

According to another aspect, the updating historical data of the head position and gaze direction of the occupant within the data storage device further includes building, over time, a heat-map of the head position and gaze direction of the occupant based on the collected real-time data of the head position and gaze direction of the occupant, and adapting the displayed HUD graphics, wherein the HUD graphics are only displayed within high gaze areas based on the heat-map of the head position and gaze direction of the occupant.

According to several aspects of the present disclosure, a head up display (HUD) system within a vehicle includes a controller adapted to initialize HUD graphics to be displayed by the HUD system within the vehicle, at least one laser adapted to project HUD graphics within a field of view of the HUD system onto an inner surface of a windshield of the vehicle, and a monitoring system adapted to collect real-time data of a head position and gaze direction of an occupant within the vehicle, wherein, the controller is further adapted to adapt the displayed HUD graphics, displayed by the HUD system, based on the real-time data of the head position and gaze direction of the occupant.

According to another aspect, the controller is further adapted to determine if there are any high priority HUD graphics to be displayed, and when there are high priority HUD graphics to be displayed, the controller is adapted to display such high priority HUD graphics without any adaptation based on the real-time data of the head position and gaze direction of the occupant.

According to another aspect, when there are no high priority HUD graphics to be displayed, the controller is adapted to determine, with the monitoring system, if the occupant is looking at a specific location within the field of view of the HUD system, and, when the occupant, based on the real-time data of the head position and gaze direction, is looking at a specific location with the field of view of the HUD system, adapt the displayed HUD graphics, wherein the HUD graphics are only displayed within the specific location in the field of view of the HUD system where the occupant is looking, and, when the occupant, based on the real-time data of the head position and gaze direction, is not looking at a specified location with the field of view of the HUD system, adapt the displayed HUD graphics, wherein only minimalistic HUD graphics are displayed.

According to another aspect, the controller is further adapted to save the real-time data of the head position and gaze direction of the occupant within the vehicle to a data storage device within the controller, and to update historical data of the head position and gaze direction of the occupant within the data storage device.

According to another aspect, when initializing HUD graphics to be displayed by the HUD system within the vehicle, the controller is further adapted to display HUD graphics based on a level of automation of the vehicle.

According to another aspect, when initializing HUD graphics to be displayed by the HUD system within the vehicle, the controller is further adapted to identify, with the monitoring system, an identity of the occupant within the vehicle, access, within the data storage device within the controller, historical data of the head position and gaze direction of the identified occupant, identify at least one region within the field of view of the HUD system, where the identified occupant historically looks based on the historical data of the head position and gaze direction of the identified occupant, and display HUD graphics only within the at least one region within the field of view of the HUD system, where the identified occupant historically looks based on the historical data of the head position and gaze direction of the identified occupant.

According to another aspect, when initializing HUD graphics to be displayed by the HUD system within the vehicle, the controller is further adapted to one of display HUD graphics based on selected preferences of the occupant, display only high priority HUD graphics, and display only minimalistic HUD graphics.

According to another aspect, when updating historical data of the head position and gaze direction of the occupant within the data storage device, the controller is further adapted to build, over time, a heat-map of the head position and gaze direction of the occupant based on the collected real-time data of the head position and gaze direction of the occupant, and adapt the displayed HUD graphics, wherein the HUD graphics are only displayed within high gaze areas based on the heat-map of the head position and gaze direction of the occupant.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Figure 1:
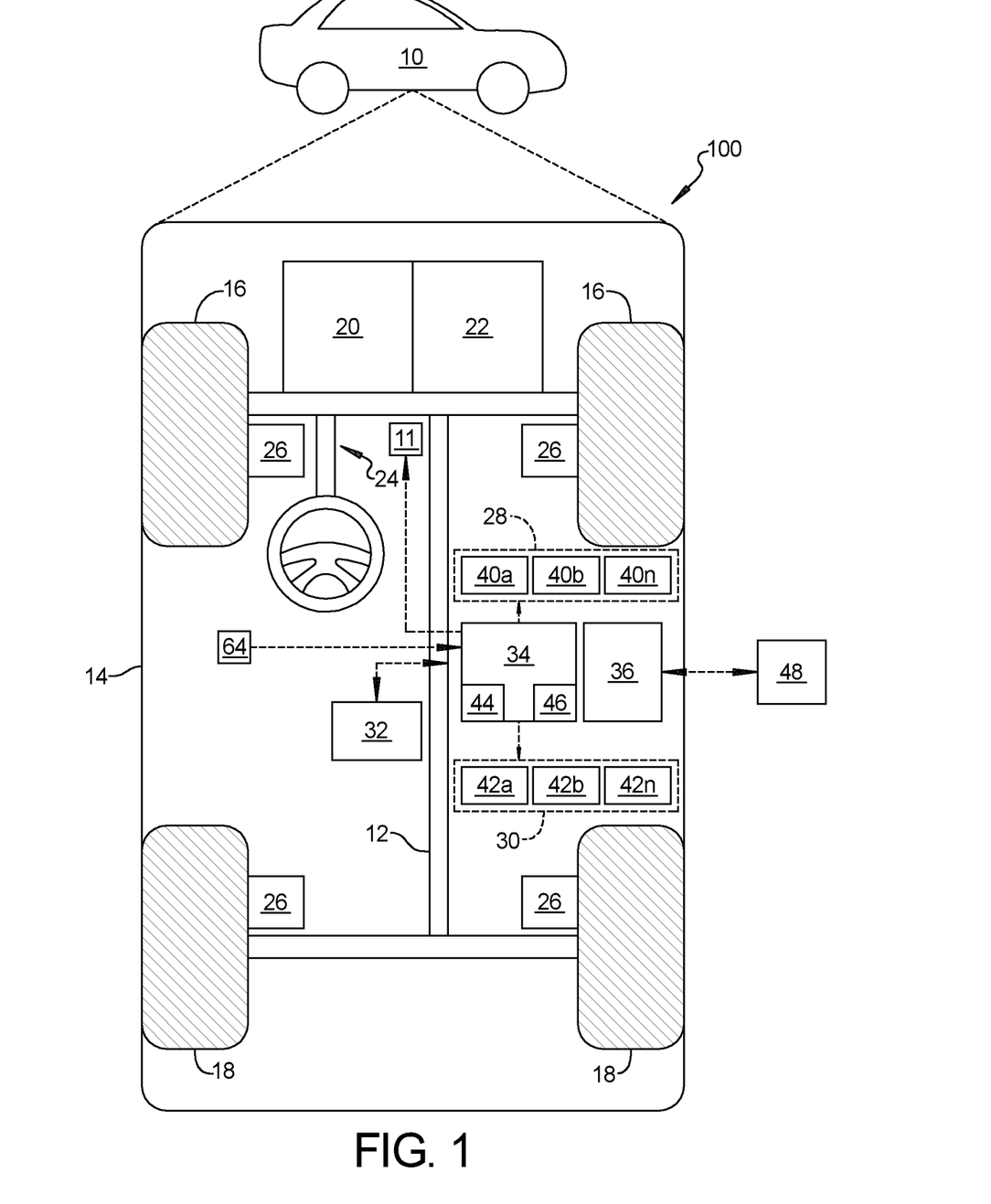
FIG. 1 is a schematic of a vehicle having a HUD system according to an exemplary embodiment of the present disclosure.

In accordance with an exemplary embodiment, FIG. 1 shows a vehicle 10 with an associated head up display (HUD) system 11 in accordance with various embodiments. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, a controller 34, and a communication system 36. In an embodiment in which the autonomous vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios.

According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The sensor system 28 includes at least one non-visual sensor 40A that is adapted to detect objects within an environment surrounding the vehicle 10, and at least one image capturing device 40b adapted to capture images of the environment surrounding the vehicle 10. The cameras can include two or more digital cameras spaced at a selected distance from each other, in which the two or more digital cameras are used to obtain stereoscopic images of the surrounding environment in order to obtain a three-dimensional image. The sensing devices 40a-40n can include sensors that monitor dynamic variables of the vehicle, such as its velocity, its acceleration, a number of times that the brake is applied, etc. The actuator system 30 includes one or more actuator devices 42a-42n that control one or more vehicle features such as, but not limited to, the propulsion system 20, the transmission system 22, the steering system 24, and the brake system 26.

The controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the controller 34, a semi-conductor based microprocessor (in the form of a microchip or chip set), a macro-processor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

The communication system 36 is configured to wirelessly communicate information to and from other entities 48, such as but not limited to, other vehicles ("V2V" communication) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
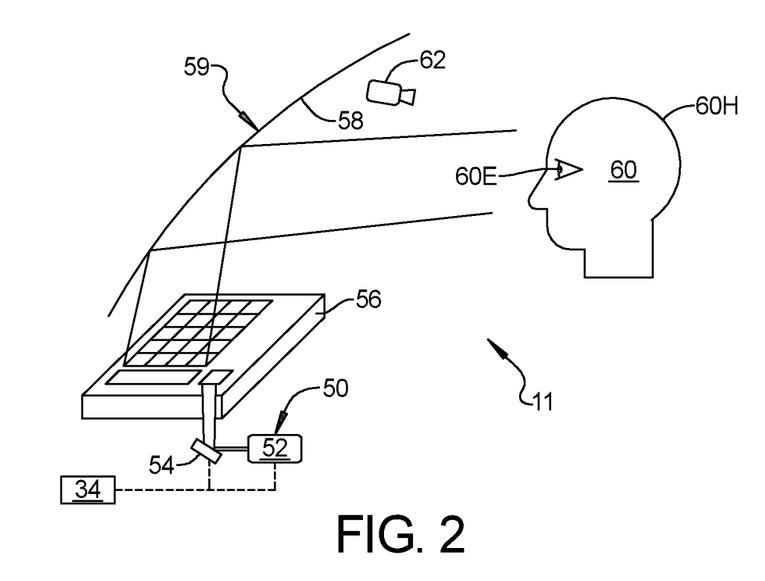
FIG. 2 is a schematic diagram of a HUD system according to an exemplary embodiment.

Referring to FIG. 2, in an exemplary embodiment, the head-up display (HUD) system 11 according to the present disclosure includes a projector 50 that is adapted to project an image. In an exemplary embodiment, the projector 50 includes a laser 52 and a spatial light modulator 54 that is adapted to project a holographic image. It should be understood that any suitable projector for use with a HUD system may be used without departing from the scope of the present disclosure.

In an exemplary embodiment, the system 11 includes an exit pupil replicator 56. The holographic image is projected into the exit pupil replicator 56 and then propagates inside the exit pupil replicator 56 and is extracted multiple times before being projected upward to an inner surface 58 of a windshield 59. The re-circulation of the light several times within the exit pupil replicator 56 expands the pupil so the viewer can see the holographic image from an extended eye-box. In addition to expanding the eye-box, the exit pupil replicator 56 also magnifies the original projected image coming out of the laser 52.

The spatial light modulator 54 is positioned between the laser 52 and the exit pupil replicator 56. The spatial light modulator 54 is adapted to receive the light from the laser 52, to diffract the laser light with an encoded hologram and to deliver the diffracted laser to the exit pupil replicator 56. The controller 34 is in communication with the laser 52 and the spatial light modulator 54. In the automobile, the controller 34 obtains information of the position of the head 60H and eyes 60E of an occupant 60 of the vehicle 10 from a camera 62 of a monitoring system 64 within the vehicle 10. The monitoring system 64 uses the camera 62 to identify the direction that the occupant 60 is looking, or the gaze direction, to enable the controller 34 to determine where the occupant 60 is looking.

The laser 52, spatial light modulator 54, and exit pupil replicator 56 are adapted to project an image upward to the windshield 58 within the vehicle. The projected image reflects from an inner surface 58 of the windshield 59 to an eyebox. The eyebox is the three-dimensional region within which an occupant 60 within the vehicle 10 can see the entire projected image from the HUD system 11. The images displayed by the HUD system 11 appear on the inner surface 58 of the windshield 59 within a field of view 61 of the HUD system 11. The field of view 61 of the HUD system is the area of the inner surface 58 of the windshield 59 within which the HUD system 11 is capable of displaying images.

Figure 3A:
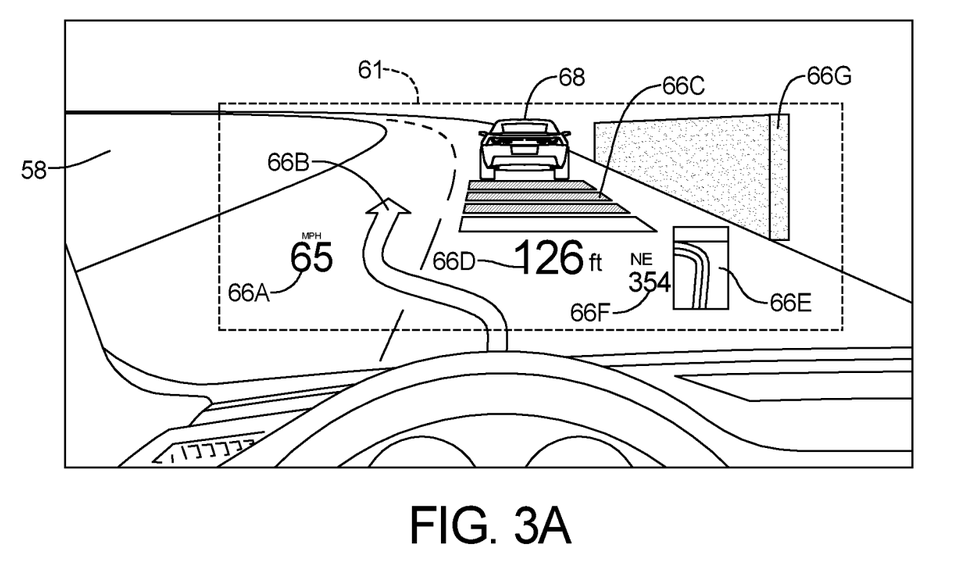
FIG. 3A is a schematic diagram of a windshield of a vehicle wherein multiple HUD graphics are displayed on an inner surface of the windshield.

In an exemplary embodiment, the controller 34 is adapted to initialize HUD graphics to be displayed by the HUD system 11 within the vehicle 10. As mentioned above, HUD systems are capable of displaying a large amount of information for the occupant 60. Referring to FIG. 3A, a schematic view of the inner surface 58 of a windshield 59 is shown, wherein a HUD system 11 is displaying multiple different HUD graphics 66 for the occupant 60.

As shown in FIG. 3A, the HUD system 11 is displaying a speed graphic 66A, which informs the occupant 60 what speed the vehicle 10 is traveling, and a suggested route 66B, which provides a suggested alternate route for the vehicle 10 to use to pass the slower vehicle 68 that is in front of the vehicle 10. In a non-autonomous vehicle, or a low-level autonomous vehicle, this suggested route may be provided as a suggestion that a driver of the vehicle 10 may or may not follow. In a high-level autonomous vehicle 10, the suggested route 66B may be informative, to alert the occupant 60 of a course correction that the vehicle 10 intends autonomously. The HUD system 11 further displays a distance alert 66C, in the form of a gradient area between the vehicle 10 and the slower moving vehicle 68 in front of the vehicle 10, and a textual distance alert 66D, in the form of numerical text informing the occupant 60 of the vehicle 10 how far away from the slower moving vehicle 68 the vehicle 10 is. The HUD system 11 further displays, for the occupant 60, a navigation graphic 66E and textual navigational information 66F to provide information and aid the occupant 60 in navigating to a destination. Finally, the HUD system 11 also displays an augmentation HUD graphic 66G intended to bring the occupant's attention to the right edge of the roadway. This augmentation graphic 66G may be as a result of the vehicle 10 drifting within a pre-defined threshold distance of the edge of the roadway, or may be intended to draw the occupant's 60 attention to something, such as road signs, or people or animals that may come into the roadway.

As mentioned above, a high amount of information being displayed on the inner surface 58 of the windshield 59 for the occupant 60 may lead to cognitive overload. Thus, when the controller 34 initializes HUD graphics 66 to be displayed by the HUD system 11 within the vehicle 10, the controller 34 only displays a reduced number of possible HUD graphics 66, or a minimalized set of HUD graphics 66 for the occupant 60.

Figure 3B:
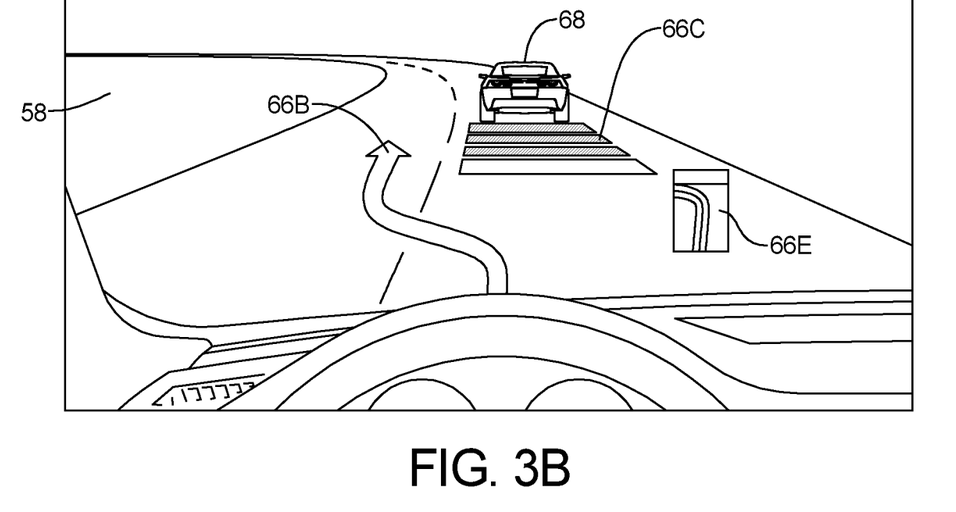
FIG. 3B is a schematic diagram of the windshield shown in FIG. 3A, wherein a minimized set of HUD graphics are displayed on the inner surface of the windshield.

Referring to FIG. 3B, in an exemplary embodiment, the controller 34, upon initialization of HUD graphics to be displayed, only displays a minimalized set of HUD graphics, including the suggested route 66B, the distance alert 66C, and the navigation graphic 66E. This help to ensure that the occupant 60 is not overloaded with too much information. Additional information, such as the speed graphic 66A, the textual distance alert 66D, the textual navigational information 66F, and the augmentation HUD graphic 66G from FIG. 3A are not displayed.

The controller 34 initializes the HUD graphics each time the HUD system 11 is started, generally, each time an occupant 60 enters the vehicle 10 and begins traveling. Once the vehicle 10 is in motion, the monitoring system 64 will collect real-time date of the head position and gaze direction of the occupant based on the position of the eyes 60E and the head 60H of the occupant, as captured by the camera 62 of the monitoring system 64. The controller 34, adapts the displayed HUD graphics, displayed by the HUD system 11, based on the real-time data of the head position and gaze direction of the occupant 60.

Figure 4A:
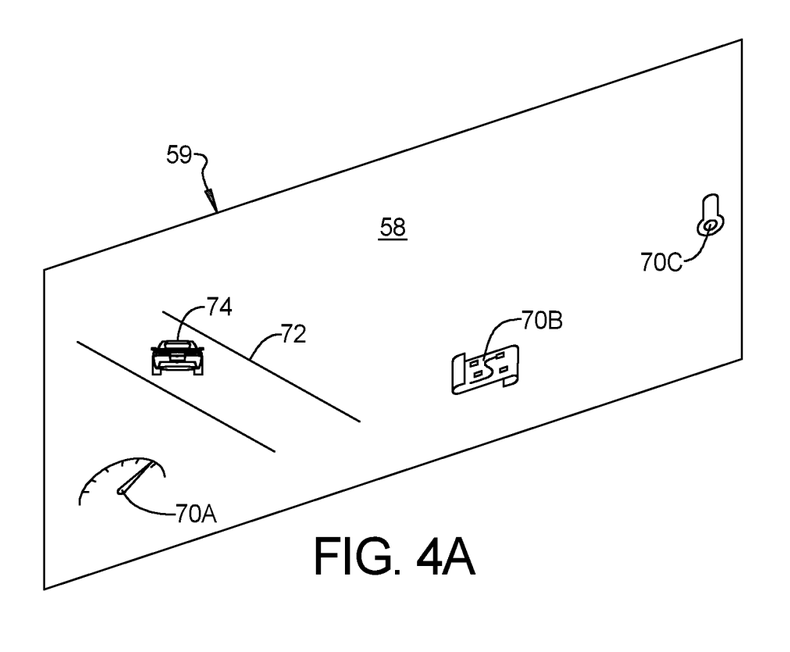
FIG. 4A is a schematic diagram of a windshield of a vehicle wherein the HUD system is displaying a minimized set of HUD graphics including a speed graphic, a navigation graphic and a temperature graphic.

Referring to FIG. 4A, a schematic view of the inner surface 59 of the windshield 59 of the vehicle 10 is shown, wherein the HUD system 11 is displaying a minimalized set of HUD graphics 70 including a speed graphic 70A, a navigation graphic 70B and a temperature graphic 70C. The occupant 60 can see the speed graphic 70A, the navigation graphic 70B and the temperature graphic 70C, as well as the roadway 72 and another vehicle 74 on the roadway 72.

Figure 4B:
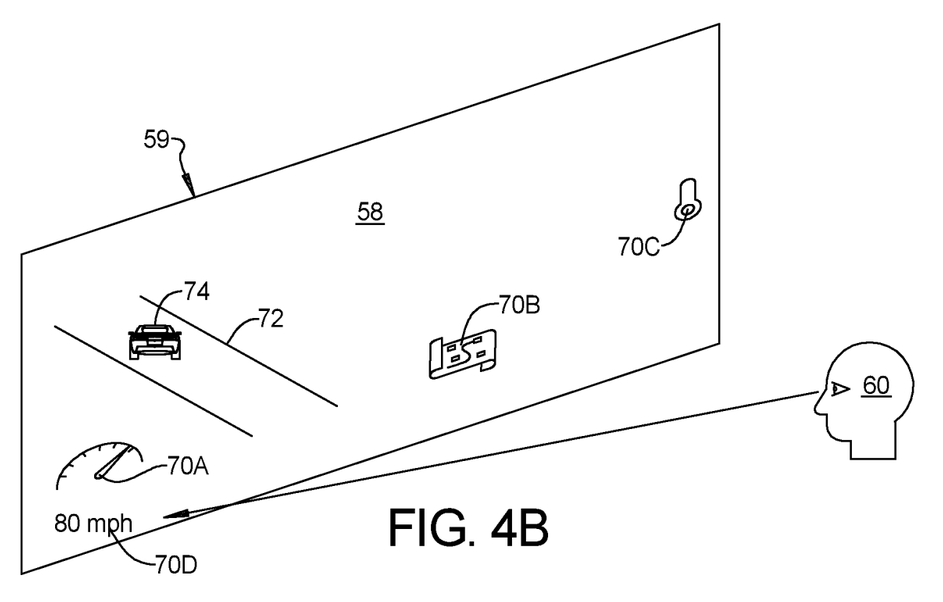
FIG. 4B is a schematic of the windshield shown in FIG. 4A, wherein in addition to the minimized set of HUD graphics, the HUD system is displaying additional textual speed information because the occupant is looking at that area of the windshield.

Referring to FIG. 4B, the same inner surface 58 of the windshield 59 of FIG. 4A is shown, however, the occupant 60 is looking at the speed graphic 70A. The controller 34 identifies the gaze direction of the occupant 60 using real-time data collected by the monitoring system 64, and selectively displays additional information that appears on the inner surface 58 of the windshield 59 where the occupant 60 is looking. As shown, the controller 34 is providing additional information with a textual speed graphic 70D.

Figure 4C:
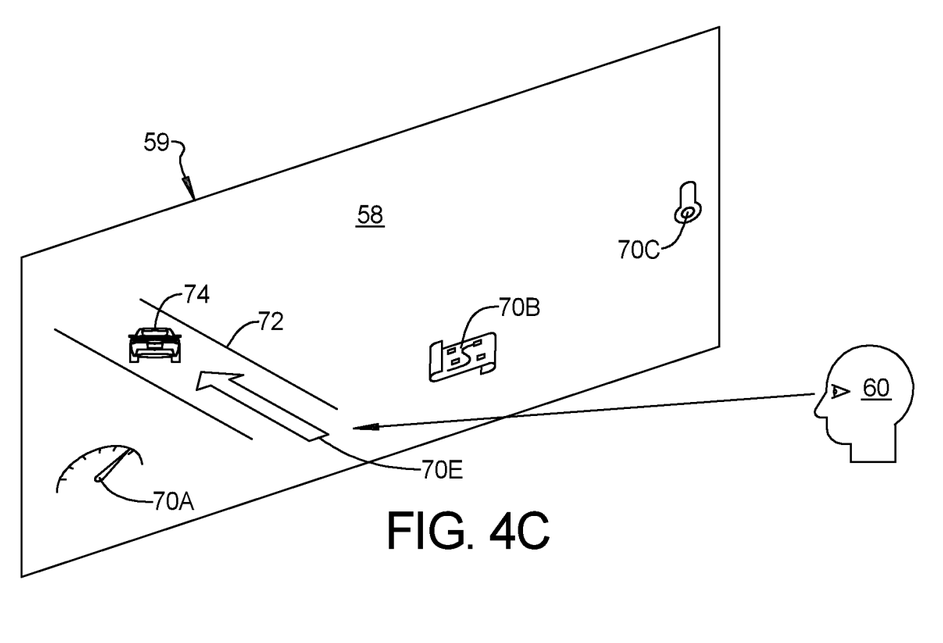
FIG. 4C is a schematic of the windshield shown in FIG. 4A, wherein in addition to the minimized set of HUD graphics, the HUD system is displaying a directional graphic because the occupant is looking at that area of the windshield.

Referring to FIG. 4C, the same inner surface 58 of the windshield 59 of FIG. 4B is shown, however, the gaze direction of the occupant has changed. Now, the occupant 60 is looking at the roadway 72 and at the vehicle 74 traveling in front of the vehicle 10. The controller 34 identifies the gaze direction of the occupant 60 using real-time data collected by the monitoring system 64, and selectively displays additional information that appears on the inner surface 58 of the windshield 59 where the occupant 60 is looking. As shown, the controller 34 is providing additional information with a directional graphic (arrow) 70E. Note, that once the occupant 60 changed their gaze direction, the textual speed graphic 70D shown in FIG. 4A is no longer displayed. Only the additional information, the directional graphic 70E, appearing where the occupant 60 is looking is displayed.

Figure 4D:
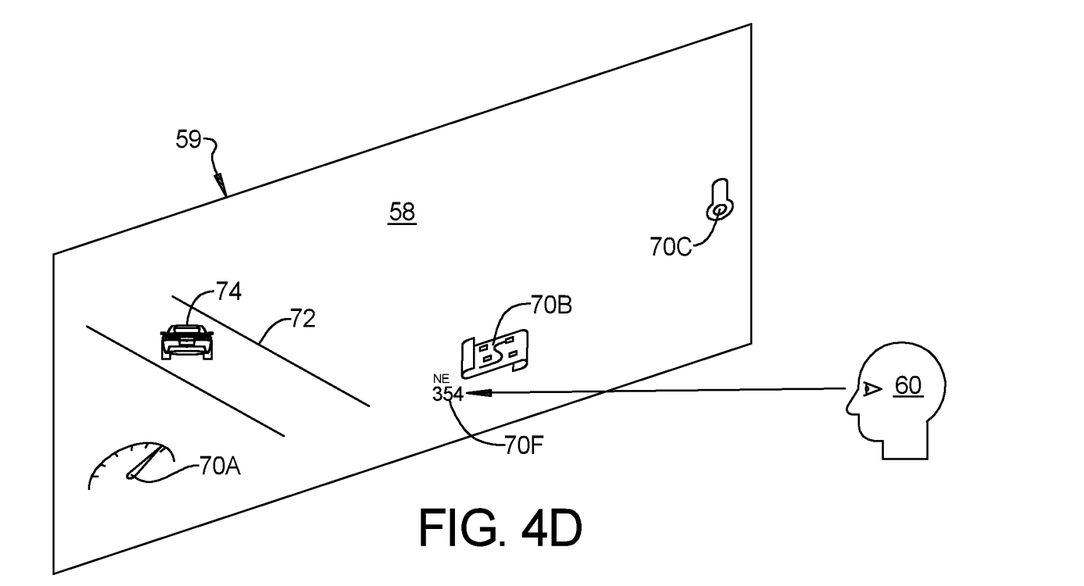
FIG. 4D is a schematic of the windshield shown in FIG. 4A, wherein in addition to the minimized set of HUD graphics, the HUD system is displaying additional textual navigation information because the occupant is looking at that area of the windshield.

Referring to FIG. 4D, the same inner surface 58 of the windshield 59 of FIG. 4B and FIG. 4C is shown, however, the gaze direction of the occupant has once again changed. Now, the occupant 60 is looking at the navigation graphic 70B. The controller 34 identifies the gaze direction of the occupant 60 using real-time data collected by the monitoring system 64, and selectively displays additional information that appears on the inner surface 58 of the windshield 59 where the occupant 60 is looking. As shown, the controller 34 is providing additional information with additional textual navigation information 70F.

Figure 4E:
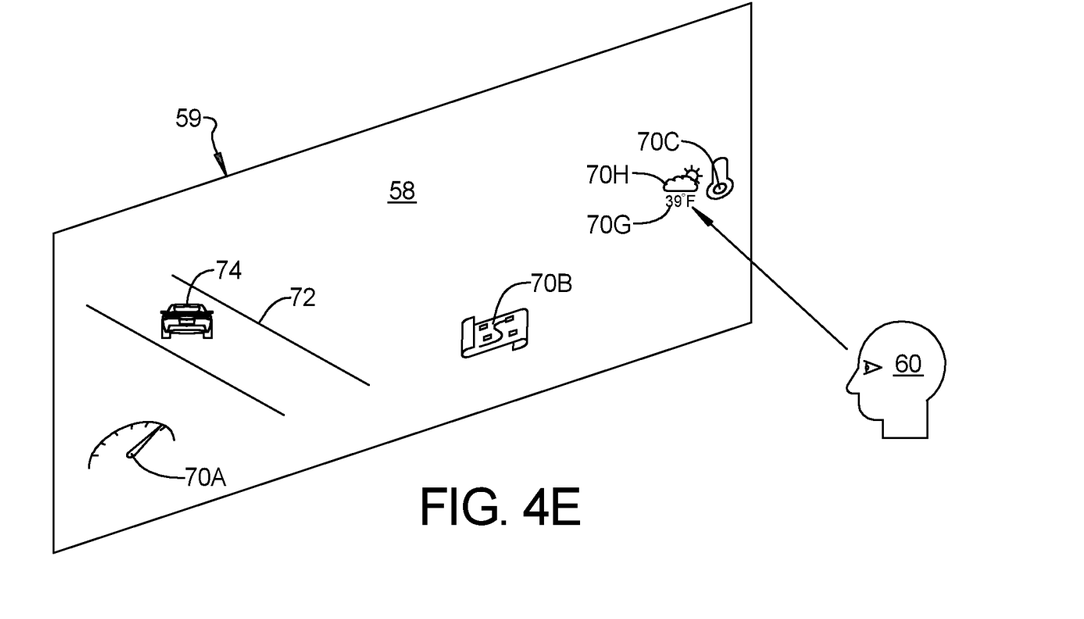
FIG. 4E is a schematic of the windshield shown in FIG. 4A, wherein in addition to the minimized set of HUD graphics, the HUD system is displaying additional textual temperature information and a weather graphic because the occupant is looking at that area of the windshield.

Referring to FIG. 4E, the same inner surface 58 of the windshield 59 of FIG. 4B, FIG. 4C and FIG. 4D is shown, however, the gaze direction of the occupant 60 has once again changed. Now, the occupant 60 is looking at the temperature graphic 70C. The controller 34 identifies the gaze direction of the occupant 60 using real-time data collected by the monitoring system 64, and selectively displays additional information that appears on the inner surface 58 of the windshield 59 where the occupant 60 is looking. As shown, the controller 34 is providing additional information with additional textual temperature information 70G and a weather graphic 70H.

In an exemplary embodiment, the controller is further adapted to determine if there are any high priority HUD graphics to be displayed. The HUD system 11, along with the sensor system 28, is adapted to monitor and identify objects within a vicinity of the vehicle 10. Further, such HUD systems 11 are adapted to identify objects or situations in proximity to the vehicle 10 that pose a risk of collision or other hazard. In such circumstances the HUD system 11 is capable of providing high priority HUD graphics (alert graphics or augmentation graphics) 76 adapted to immediately draw the occupant's attention to such objects or situations. In one exemplary embodiment, when such high priority HUD graphics 76 are called for, the controller 34 is adapted to display such high priority HUD graphics 76 without any adaptation based on the real-time data of the head position and gaze direction of the occupant 60. Wherein, the high priority HUD graphics 76 are displayed along with whatever minimalized or adapted HUD graphics 70 that are already being displayed.

Figure 5:
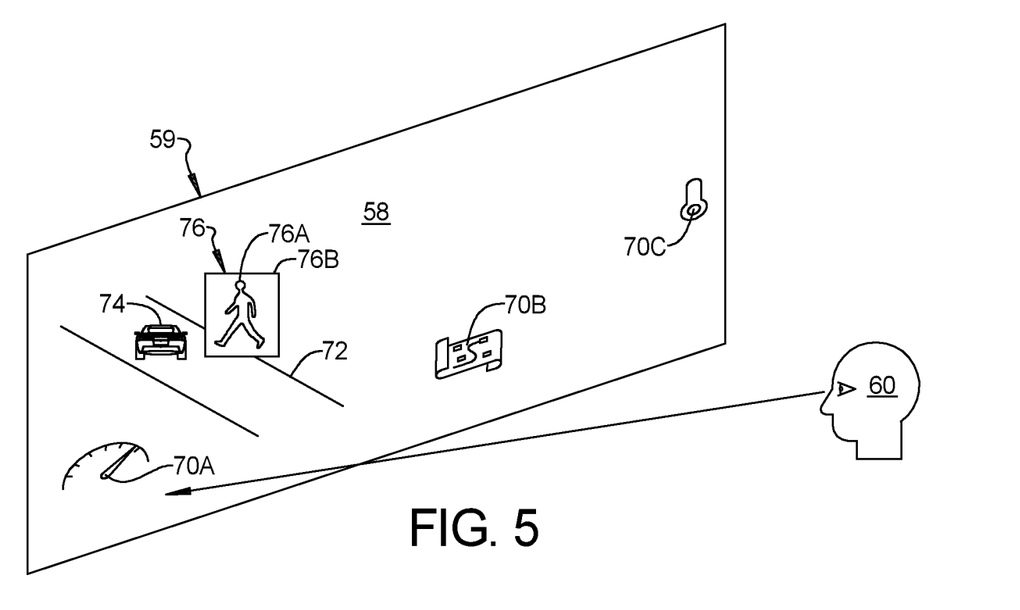
FIG. 5 is a schematic of the windshield shown in FIG. 4A, wherein in addition to the minimized set of HUD graphics, the HUD system is displaying a high priority HUD graphic.

Referring to FIG. 5, the same inner surface 58 of the windshield 59 of FIG. 4A is shown, wherein, the gaze direction of the occupant 60 is directed toward the speed graphic 70A. The sensor system 28 of the vehicle 10 has identified a pedestrian that is about to enter the roadway 72 in front of the vehicle 10. The HUD system 11 provides a high priority HUD graphic 76, as shown, an icon of a walking pedestrian 76A, positioned at the edge of the roadway 72 and an augmentation graphic 76B, as shown a square box highlighting the icon 76A. The augmentation graphic 76B may be brightly colored, appear blinking, or changing intensity to draw the occupant's 60 attention. The controller 34 allows display of the icon of the walking pedestrian 76A and the augmentation graphic 76B, at a location on the inner surface 58 of the windshield 59 corresponding to the position of the actual pedestrian without regard for the gaze direction of the occupant 60. In this way, the attention of the occupant 60 will be caught, regardless of the direction in which the occupant is looking.

Figure 6:
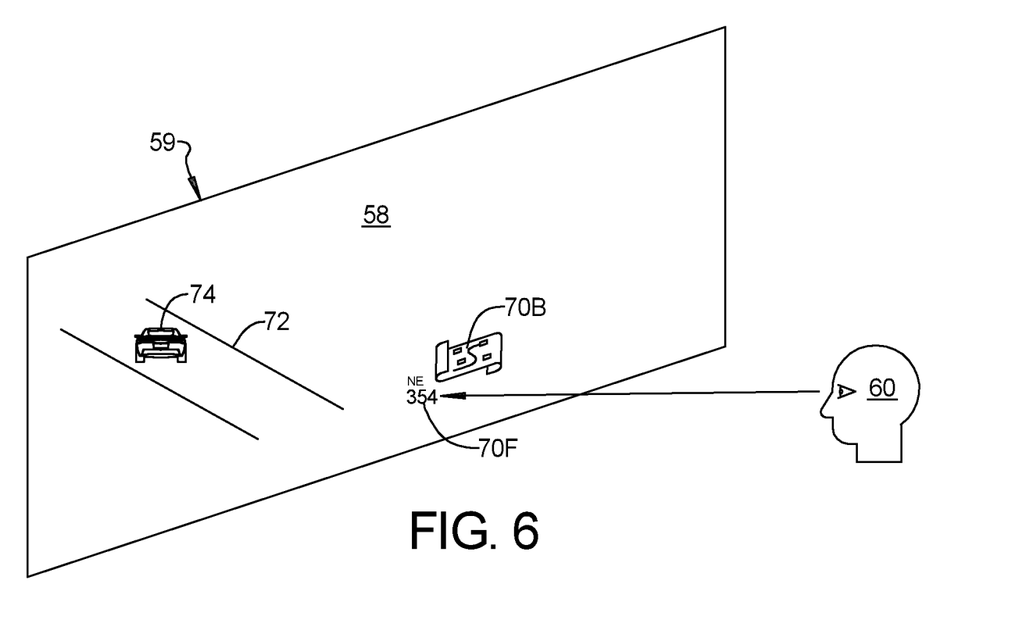
FIG. 6 is a schematic of the windshield shown in FIG. 4A, wherein the HUD system is displaying HUD graphics only in the area where the occupant is looking.

In another exemplary embodiment, when there are no high priority HUD graphics to be displayed, the controller 34 is adapted to determine, with the monitoring system 64, if the occupant 60 is looking at a specific location within the field of view of the HUD system 11. If the occupant 60, based on the real-time data of the head position and gaze direction of the occupant 60, is looking at a specific location within the field of view of the HUD system 11, the controller 34 adapts the displayed HUD graphics, wherein the HUD graphics are only displayed within the specific location within the field of view of the HUD system 11 where the occupant is looking. Referring to FIG. 6, the same inner surface 58 of the windshield 59 of FIG. 4D is shown, wherein the occupant is looking at the navigational graphic 70B and, because the occupant 60 is looking there, the textual navigation information 70F. Because the gaze of the occupant 60 is focused on the location of the navigational graphic 70B and the textual navigation information 70F, the controller 34 causes the HUD system 11 to display HUD graphics only at that location, and thus, no other HUD graphics appear.

When the occupant 60, based on the real-time data of the head position and gaze direction, is not looking at a specified location within the field of view of the HUD system 11, the controller 34 adapts the displayed HUD graphics, wherein only minimalistic HUD graphics are displayed, as shown in FIG. 4A.

In an exemplary embodiment, the controller 34 is further adapted to save the real-time data of the head position and gaze direction of the occupant, collected by the monitoring system 64, within the vehicle to a data storage device 32 within the controller 34. Real-time collected data is used to update historical data of the head position and gaze direction of the occupant 60 within the data storage device 32. This historical information can be used by the controller 34 when the controller 34 initializes HUD graphics to be displayed, as discussed below.

When initializing the HUD graphics to be displayed, the controller 34 may use multiple different criteria. For example, in an exemplary embodiment, when initializing HUD graphics to be displayed by the HUD system 11 within the vehicle 10, the controller 34 is further adapted to display HUD graphics based on a level of automation of the vehicle 10. For example, in a higher level autonomous vehicle, such as a level 4 or 5 autonomous vehicle, more information can be provided without overloading an occupant, because the occupant is not focused on actually driving the vehicle 10. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

Thus, in such level 4 and level 5 autonomous vehicles, the occupant 60 is less focused on driving, and a HUD system 11 will display additional information without worry of cognitive overload. For example, in an exemplary embodiment, the HUD system 11 is an augmented reality head-up display systems (AR-HUD) that is capable of identifying points of interest to an occupant, and providing augmentation graphics to highlight such locations to an occupant when the vehicle 10 passes such a location, and to provide information about products/services provided by a particular point of interest. If the vehicle 10 is a high level (level 4 or level 5) autonomous vehicle, the HUD system 11 and the controller 34 will allow inclusion of such augmentation graphics and information, because the occupant 60 will be able to recognize and utilize such information without risk of cognitive overload. However, if the vehicle 10 is a lower level autonomous vehicle or not autonomous at all, the occupant 60 will have a significant amount of attention taken up by operating the vehicle 10, and thus, the HUD system 11 and controller 34, will not include such augmentation graphics to the occupant 60.

In another exemplary embodiment, when initializing HUD graphics to be displayed by the HUD system 11 within the vehicle 10, the controller 34 is further adapted to identify, with the monitoring system 64, an identity of the occupant 60 within the vehicle 11, and to access, within the data storage device 32 within the controller 34, historical data of the head position and gaze direction of the identified occupant 60. As discussed above, by consistently gathering real-time data of an occupant's 60 gaze direction, and updating historical data of the occupant's 60 gaze direction, patterns and habits for the occupant 60 can be established. The controller is further adapted to identify at least one region 78 within the field of view 61 of the HUD system 11, where the identified occupant 60 historically looks based on the historical data of the head position and gaze direction of the identified occupant 60, and to display HUD graphics only within the at least one region 78 within the field of view of the HUD system 11, where the identified occupant 60 historically looks based on the historical data of the head position and gaze direction of the identified occupant 60.

Figure 7:
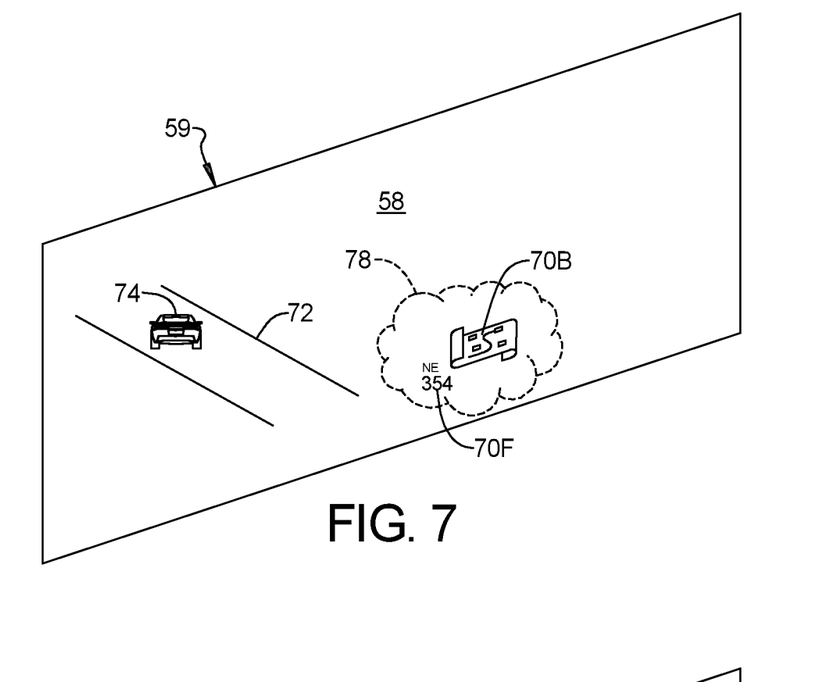
FIG. 7 is a schematic of the windshield shown in FIG. 4A, wherein the controller has identified a region where the occupant has historically focused their attention and the HUD system is displaying HUD graphics only within the region.
Figure 8:
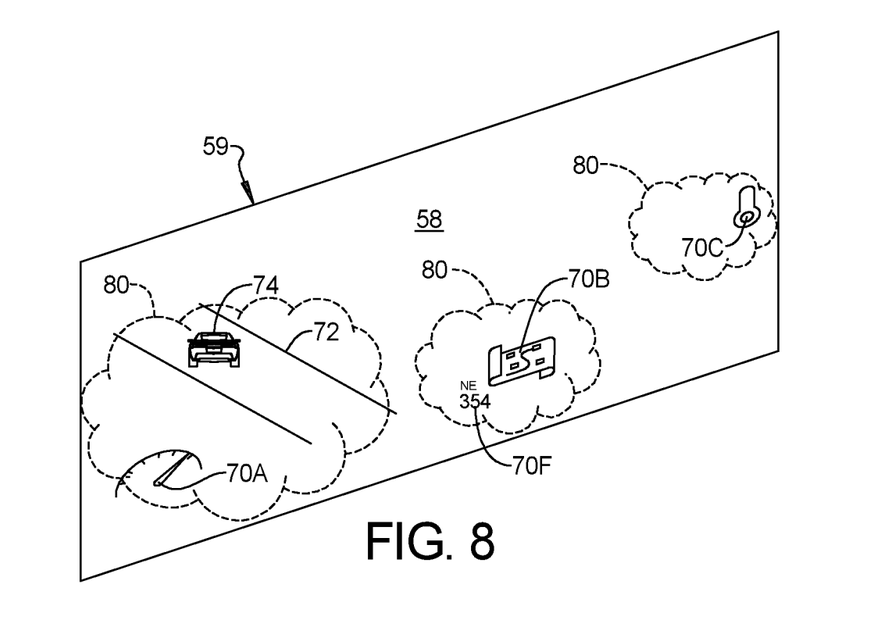
FIG. 8 is a schematic of the windshield shown in FIG. 4A, wherein the controller has built a heat map based on historical information of an occupant's gaze direction and the HUD system is displaying HUD graphics only within high gaze areas identified within the heat map.

Referring to FIG. 7, based on historical data for a subject occupant 60, the controller 34 identifies a region 78 where the occupant 60 looks primarily or the most frequently, and selectively displays HUD graphics, such as the navigation graphic 70B and the textual navigation information 70F, which are positioned within the region 78, for the occupant 60. In another example of an exemplary embodiment, the controller 34 is adapted to use the historical data for an occupant 60 to build a heat map across the field of view of the HUD system 11. The heat map will identify multiple areas that are "high gaze areas" 80, or areas that are historically the most looked at by the occupant 60. Referring to FIG. 8, based on the historical data for a subject occupant 60, the controller builds a heat map that includes multiple high gaze areas 80 where the occupant 60 historically looks. The controller 34 causes the HUD system 11 to display appropriate HUD graphics within the high gaze areas 80, and thus, the speed graphic 70A, the navigation graphic 70B, the textual navigational information 70F, and the temperature graphic 70C are displayed upon initialization.

In other exemplary embodiments, when initializing HUD graphics to be displayed by the HUD system 11 within the vehicle 10, the controller 34 is further adapted to use different criteria, such as displaying HUD graphics based on selected preferences of the occupant 60. An occupant 60 may selectively input their personal preferences to the controller 34, such that when an occupant 60 enters the vehicle 10, the controller 34, via the monitoring system 64, identifies the occupant 60 and initializes the HUD graphics to be displayed based on that occupant's 60 personal preferences. For example, the occupant 60 may want to always see the weather graphic 70H, shown in FIG. 4E. Or, possibly the occupant 60 is not concerned with clutter or cognitive overload, and wants to see all the possible HUD graphics all the time. In another exemplary embodiment, the controller 34 initializes HUD graphics by displaying only high priority HUD graphics, or by displaying only minimalistic HUD graphics, as shown in FIG. 4A.

Figure 9:
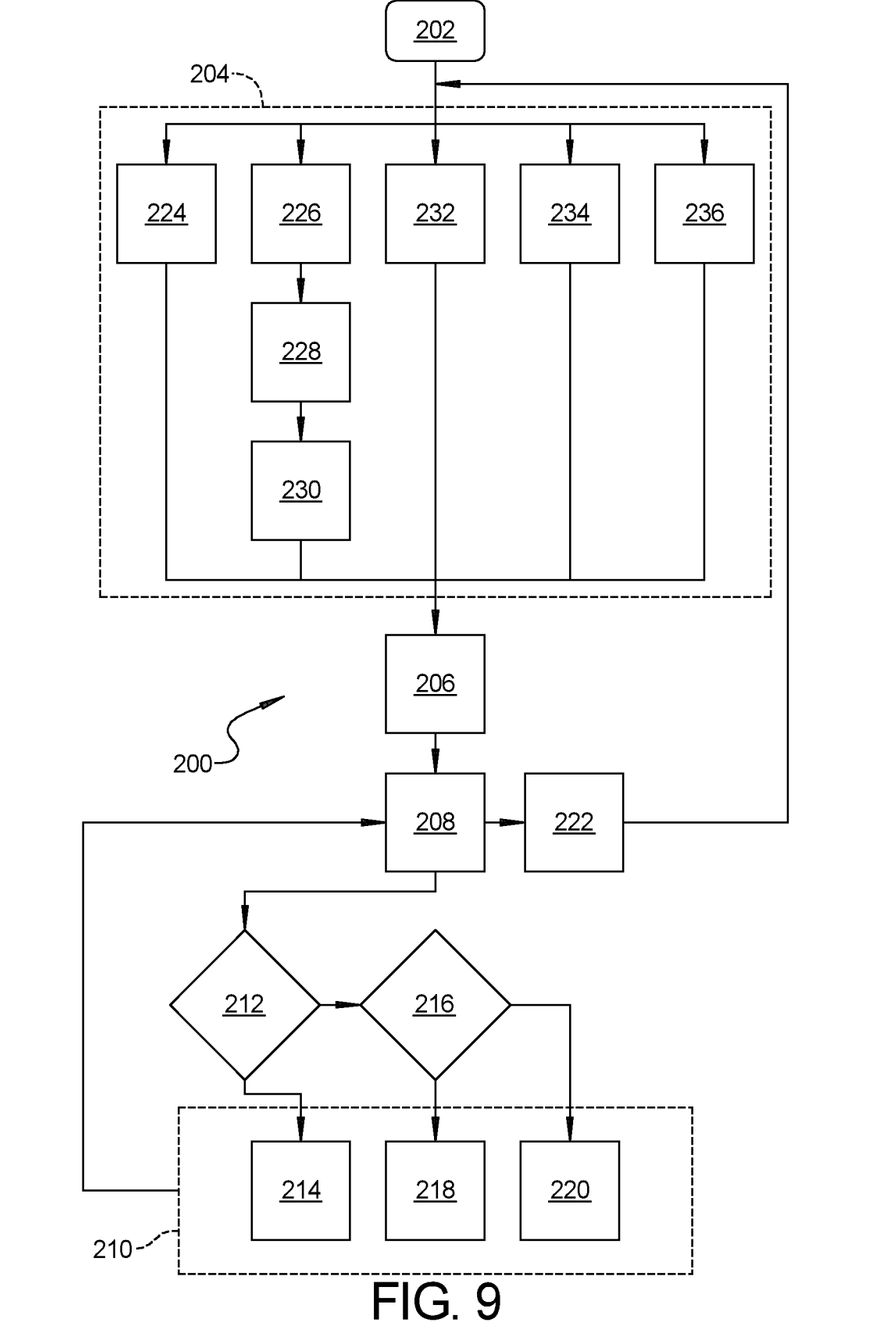
FIG. 9 is a flow chart illustrating a method according to an exemplary embodiment of the present disclosure.

Referring to FIG. 9, a flowchart illustrates a method 200 of providing an adaptive head up display (HUD) within a vehicle 10. Beginning at block 202, an occupant 60 enters and starts a vehicle 10. Moving to block 204, the method 200 includes initializing, with the controller 34, HUD graphics to be displayed by the HUD system 11 within the vehicle 11. Moving to block 206, the method 200 includes displaying, with at least one laser 52 adapted to project an image onto an inner surface 58 of a windshield 59 of the vehicle 10, HUD graphics within a field of view 61 of the HUD system 11, and moving to block 208, collecting, with a monitoring system 64, real-time data of a head position and gaze direction of the occupant 60 within the vehicle 10. Moving to block 210, the method 200 further includes adapting, with the controller 34, the HUD graphics displayed by the HUD system 11, based on the real-time data of the head position and gaze direction of the occupant 60.

In an exemplary embodiment, moving to block 212, the method further includes determining, with the controller 34, if there are any high priority HUD graphics 76 to be displayed, and when there are high priority HUD graphics 76 to be displayed, moving to block 214, displaying such high priority HUD graphics 76 without any adaptation based on the real-time data of the head position and gaze direction of the occupant 60.

In another exemplary embodiment, when there are no high priority HUD graphics to be displayed at block 212, then, moving from block 212 to block 216, the method includes determining if the occupant 60 is looking at a specific location within the field of view 61 of the HUD system 11, and, when the occupant 60, based on the real-time data of the head position and gaze direction, is looking at a specific location with the field of view of the HUD system 11, moving to block 218, adapting the displayed HUD graphics, wherein the HUD graphics are only displayed within the specific location within the field of view 61 of the HUD system 11 where the occupant 60 is looking.

In another exemplary embodiment, when the occupant 60, based on the real-time data of the head position and gaze direction, is not looking at a specified location with the field of view 61 of the HUD system 11, moving from block 216 to block 220, the method 200 includes adapting the displayed HUD graphics, wherein only minimalistic HUD graphics are displayed.

In another exemplary embodiment the method includes, moving from block 208 to block 222, saving the real-time data of the head position and gaze direction of the occupant 60 within the vehicle 10 to a data storage device 32 within the controller 34, and updating historical data of the head position and gaze direction of the occupant 60 within the data storage device 32, such information being fed back to the controller 34 for use when initializing the HUD graphics to be displayed.

In an exemplary embodiment, the initializing the initializing, with the controller 34, HUD graphics to be displayed by the HUD system 11 within the vehicle 10 at block 204 further includes, moving to block 224, displaying HUD graphics based on a level of automation of the vehicle 10.

In another exemplary embodiment, the initializing, with the controller 34, HUD graphics to be displayed by the HUD system 11 within the vehicle 10 a block 204 further includes, moving to block 226, identifying, with the monitoring system 64, an identity of the occupant 60 within the vehicle 10, moving to block 228, accessing, within the data storage device 32 within the controller 34, historical data of the head position and gaze direction of the identified occupant 60, moving to block 230, identifying, with the controller 34, at least one region 78 within the field of view 61 of the HUD system 11, where the identified occupant 60 historically looks based on the historical data of the head position and gaze direction of the identified occupant 60, and, moving to block 206, displaying HUD graphics only within the at least one region 78 within the field of view 61 of the HUD system 11, where the identified occupant 60 historically looks based on the historical data of the head position and gaze direction of the identified occupant 60.

In another exemplary embodiment, the initializing, with the controller, HUD graphics to be displayed by the HUD system 11 within the vehicle at block 204 further includes, moving to block 232, displaying HUD graphics based on selected preferences of the occupant 60.

In another exemplary embodiment, the initializing, with the controller 34, HUD graphics to be displayed by the HUD system 11 within the vehicle at block 204 further includes, moving to block 234, displaying only high priority HUD graphics 76.

In another exemplary embodiment, the initializing, with the controller 34, HUD graphics to be displayed by the HUD system 11 within the vehicle 10 at block 204, further includes, moving to block 236, displaying only minimalistic HUD graphics.

In still another exemplary embodiment, the updating historical data of the head position and gaze direction of the occupant within the data storage device 32, at block 222, further includes building, over time, a heat-map of the head position and gaze direction of the occupant 60 based on the collected real-time data of the head position and gaze direction of the occupant 60, and adapting the displayed HUD graphics, wherein the HUD graphics are only displayed within high gaze areas 80 based on the heat-map of the head position and gaze direction of the occupant 60.

A system and method of the present disclosure offers several advantages. These include minimizing the amount of information being displayed (information clutter) depending on the automation level of the vehicle and based on where the occupant is looking. By reducing clutter, cognitive load excreted on an occupant due to presenting too much information is reduced. By reducing clutter, more open space of the windshield is available for an occupant to see the environment outside the vehicle, and reduce incidents that may be caused by distraction and cognitive overload.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of providing an adaptive head up display (HUD) within a vehicle, comprising:
   initializing, with a controller, HUD graphics to be displayed by a HUD system within the vehicle;
   displaying, with a projector adapted to project an image onto an inner surface of a windshield of the vehicle, HUD graphics within a field of view of the HUD system;
   collecting, with a monitoring system, real-time data of a head position and gaze direction of an occupant within the vehicle;
   determining if the occupant is looking at a specific location within a field of view of the HUD system; and
   adapting, with the controller, the HUD graphics displayed by the HUD system, based on the real-time data of the head position and gaze direction of the occupant;
   wherein, when the occupant, based on the real-time data of the head position and gaze direction, is not looking at a specific location with the field of view of the HUD system, the adapting, with the controller, the HUD graphics displayed by the HUD system includes adapting the displayed HUD graphics, wherein only minimalistic HUD graphics are displayed.

2. The method of claim 1, further including:
   determining, with the controller, if there are any high priority HUD graphics to be displayed, and when there are high priority HUD graphics to be displayed, displaying such high priority HUD graphics without any adaptation based on the real-time data of the head position and gaze direction of the occupant.

3. The method of claim 2, wherein, when there are no high priority HUD graphics to be displayed, and, when the occupant, based on the real-time data of the head position and gaze direction, is looking at a specific location with the field of view of the HUD system, the adapting, with the controller, the HUD graphics displayed by the HUD system further includes adapting the displayed HUD graphics, wherein the HUD graphics are only displayed within the specific location within the field of view of the HUD system where the occupant is looking.

4. The method of claim 3, wherein, when there are no high priority HUD graphics to be displayed, and, when the occupant, based on the real-time data of the head position and gaze direction, is not looking at a specified location with the field of view of the HUD system, the adapting, with the controller, the HUD graphics displayed by the HUD system further includes adapting the displayed HUD graphics, wherein only minimalistic HUD graphics are displayed.

5. The method of claim 1, further including:
saving the real-time data of the head position and gaze direction of the occupant within the vehicle to a data storage device within the controller; and
updating historical data of the head position and gaze direction of the occupant within the data storage device.

6. The method of claim 5 wherein the initializing, with the controller, HUD graphics to be displayed by a HUD system within the vehicle further includes displaying HUD graphics based on a level of automation of the vehicle.

7. The method of claim 5, wherein the initializing, with the controller, HUD graphics to be displayed by the HUD system within the vehicle further includes:
identifying, with the monitoring system, an identity of the occupant within the vehicle;
accessing, within a data storage device within the controller, historical data of the head position and gaze direction of the identified occupant;
identifying, with the controller, at least one region within the field of view of the HUD system, where the identified occupant historically looks based on the historical data of the head position and gaze direction of the identified occupant; and
displaying HUD graphics only within the at least one region within the field of view of the HUD system, where the identified occupant historically looks based on the historical data of the head position and gaze direction of the identified occupant.

8. The method of claim 5, wherein the initializing, with the controller, HUD graphics to be displayed by the HUD system within the vehicle further includes displaying HUD graphics based on a selected preferences of the occupant.

9. The method of claim 5, wherein the initializing, with the controller, HUD graphics to be displayed by the HUD system within the vehicle further includes displaying only high priority HUD graphics.

10. The method of claim 5, wherein the initializing, with the controller, HUD graphics to be displayed by the HUD system within the vehicle further includes displaying only minimalistic HUD graphics.

11. The method of claim 5, wherein, the updating historical data of the head position and gaze direction of the occupant within the data storage device further includes:
building, over time, a heat-map of the head position and gaze direction of the occupant based on the collected real-time data of the head position and gaze direction of the occupant; and
adapting the displayed HUD graphics, wherein the HUD graphics are only displayed within high gaze areas based on the heat-map of the head position and gaze direction of the occupant.

12. A head up display (HUD) system within a vehicle, comprising:
a controller adapted to initialize HUD graphics to be displayed by the HUD system within the vehicle;
a projector adapted to project HUD graphics within a field of view of the HUD system onto an inner surface of a windshield of the vehicle; and
a monitoring system adapted to collect real-time data of a head position and gaze direction of an occupant within the vehicle;
wherein, the controller is further adapted to adapt the displayed HUD graphics, displayed by the HUD system, based on the real-time data of the head position and gaze direction of the occupant;
further wherein, the controller is adapted to:
determine, with the monitoring system, if the occupant is looking at a specific location within the field of view of the HUD system; and
when the occupant, based on the real-time data of the head position and gaze direction, is not looking at a specified location with the field of view of the HUD system, adapt the displayed HUD graphics, wherein only minimalistic HUD graphics are displayed.

13. The system of claim 12, wherein the controller is further adapted to determine if there are any high priority HUD graphics to be displayed, and when there are high priority HUD graphics to be displayed, the controller is adapted to display such high priority HUD graphics without any adaptation based on the real-time data of the head position and gaze direction of the occupant.

14. The system of claim 13, wherein, when there are no high priority HUD graphics to be displayed, the controller is adapted to:
when the occupant, based on the real-time data of the head position and gaze direction, is looking at a specific location with the field of view of the HUD system, adapt the displayed HUD graphics, wherein the HUD graphics are only displayed within the specific location within the field of view of the HUD system where the occupant is looking; and
when the occupant, based on the real-time data of the head position and gaze direction, is not looking at a specified location with the field of view of the HUD system, adapt the displayed HUD graphics, wherein only minimalistic HUD graphics are displayed.

15. The system of claim 12, wherein the controller is further adapted to save the real-time data of the head position and gaze direction of the occupant within the vehicle to a data storage device within the controller, and to update historical data of the head position and gaze direction of the occupant within the data storage device.

16. The system of claim 15 wherein when initializing HUD graphics to be displayed by the HUD system within the vehicle, the controller is further adapted to display HUD graphics based on a level of automation of the vehicle.

17. The system of claim 15, wherein, when initializing HUD graphics to be displayed by the HUD system within the vehicle, the controller is further adapted to:
identify, with the monitoring system, an identity of the occupant within the vehicle;
access, within the data storage device within the controller, historical data of the head position and gaze direction of the identified occupant;

identify at least one region within the field of view of the HUD system, where the identified occupant historically looks based on the historical data of the head position and gaze direction of the identified occupant; and display HUD graphics only within the at least one region within the field of view of the HUD system, where the identified occupant historically looks based on the historical data of the head position and gaze direction of the identified occupant.

18. The system of claim 15, wherein, when initializing HUD graphics to be displayed by the HUD system within the vehicle, the controller is further adapted to one of:

display HUD graphics based on selected preferences of the occupant;

display only high priority HUD graphics; and display only minimalistic HUD graphics.

19. The system of claim 15, wherein, when updating historical data of the head position and gaze direction of the occupant within the data storage device, the controller is further adapted to:

build, over time, a heat-map of the head position and gaze direction of the occupant based on the collected real-time data of the head position and gaze direction of the occupant; and adapt the displayed HUD graphics, wherein the HUD graphics are only displayed within high gaze areas based on the heat-map of the head position and gaze direction of the occupant.

20. A method of providing an adaptive head up display (HUD) within a vehicle, comprising:

initializing, with a controller, HUD graphics to be displayed by a HUD system within the vehicle by one of:

displaying, with a projector adapted to project an image onto an inner surface of a windshield of the vehicle, HUD graphics based on a level of automation of the vehicle;

identifying, with the monitoring system, an identity of the occupant within the vehicle, accessing, within a data storage device within the controller, historical data of the head position and gaze direction of the identified occupant, identifying, with the controller, at least one region within the field of view of the HUD system, where the identified occupant historically looks based on the historical data of the head position and gaze direction of the identified occupant, and displaying, with the a holographic projector adapted to project an image onto the inner surface of the windshield of the vehicle, HUD graphics only within the at least one region within the field of view of the HUD system, where the identified occupant historically looks based on the historical data of the head position and gaze direction of the identified occupant;

displaying, with the projector adapted to project an image onto the inner surface of the windshield of the vehicle, HUD graphics based on a selected preferences of the occupant;

displaying, with the projector adapted to project an image onto the inner surface of the windshield of the vehicle, only high priority HUD graphics;

displaying, with the projector adapted to project an image onto the inner surface of the windshield of the vehicle, only minimalistic HUD graphics;

collecting, with a monitoring system, real-time data of a head position and gaze direction of an occupant within the vehicle;

saving the real-time data of the head position and gaze direction of the occupant within the vehicle to a data storage device within the controller;

updating historical data of the head position and gaze direction of the occupant within the data storage device;

determining, with the controller, if there are any high priority HUD graphics to be displayed, and:

when there are high priority HUD graphics to be displayed, displaying such high priority HUD graphics without any adaptation based on the real-time data of the head position and gaze direction of the occupant; and when there are no high priority HUD graphics to be displayed, determining if the occupant is looking at a specific location within a field of view of the HUD system; and when the occupant, based on the real-time data of the head position and gaze direction, is looking at a specific location with the field of view of the HUD system, adapting the displayed HUD graphics, wherein the HUD graphics are only displayed within the specific location within the field of view of the HUD system where the occupant is looking; and when the occupant, based on the real-time data of the head position and gaze direction, is not looking at a specified location with the field of view of the HUD system, the method includes adapting the displayed HUD graphics, wherein only minimalistic HUD graphics are displayed.

* * * * *